US006505825B1

(12) United States Patent
Hurst et al.

(10) Patent No.: US 6,505,825 B1
(45) Date of Patent: Jan. 14, 2003

(54) UNIVERSAL WORK HOLDER ARRANGEMENT

(75) Inventors: Richard E. Hurst, Rochester Hills, MI (US); Mark A. Crongeyer, Washington Township, MI (US)

(73) Assignee: Erie Automation Company, Troy, MI (US)

( * ) Notice: Subject to any disclaimer, the term of this patent is extended or adjusted under 35 U.S.C. 154(b) by 0 days.

(21) Appl. No.: 09/720,145

(22) PCT Filed: Jun. 22, 1999

(86) PCT No.: PCT/US99/14020

§ 371 (c)(1),
(2), (4) Date: Mar. 23, 2001

(87) PCT Pub. No.: WO99/67050

PCT Pub. Date: Dec. 29, 1999

Related U.S. Application Data

(63) Continuation-in-part of application No. 09/102,543, filed on Jun. 22, 1999, now Pat. No. 6,059,278.

(51) Int. Cl.[7] .................................................. B23Q 1/04

(52) U.S. Cl. ............................. 269/71; 269/72; 269/45; 269/48.1; 269/75; 269/78; 269/82

(58) Field of Search ......................... 285/145.1; 269/45, 269/75, 77, 78, 82, 48.1, 71, 72; 403/364, 367, 368

(56) References Cited

U.S. PATENT DOCUMENTS

| | | | | |
|---|---|---|---|---|
| 1,306,858 A | * | 6/1919 | Salter | 269/78 |
| 2,175,974 A | * | 10/1939 | Shurtz | 269/45 |
| 2,542,967 A | * | 2/1951 | Waechter | 403/368 |
| 2,850,308 A | * | 9/1958 | LeFabvre et al. | 403/368 |
| 3,080,490 A | | 3/1963 | Newcomb | 307/112 |
| 3,349,927 A | | 10/1967 | Blatt | 214/1 |
| 3,568,959 A | | 3/1971 | Blatt | 294/64 |
| 3,613,904 A | | 10/1971 | Blatt | 214/1 BV |
| 4,050,661 A | | 9/1977 | Wooldridge | 248/285 |
| 4,135,274 A | * | 1/1979 | Freeman | 285/298 |
| 4,239,169 A | * | 12/1980 | DeSantis | 403/368 |
| 4,463,980 A | | 8/1984 | Orii | 294/64 R |
| 4,828,306 A | | 5/1989 | Blatt | 294/64.2 |
| 4,846,625 A | | 7/1989 | Gabillet | 414/737 |
| 4,865,484 A | | 9/1989 | McConnell | 403/59 |
| D315,094 S | | 3/1991 | Blatt | D8/396 |
| D320,548 S | | 10/1991 | Blatt | D8/396 |
| 5,261,715 A | | 11/1993 | Blatt et al. | 294/88 |
| 5,271,651 A | | 12/1993 | Blatt et al. | 294/88 |
| 5,299,847 A | | 4/1994 | Blatt et al. | 294/88 |
| 6,059,278 A | * | 5/2000 | Hurst et al. | 269/71 |

* cited by examiner

*Primary Examiner*—Robert C. Watson
(74) *Attorney, Agent, or Firm*—Raphael A. Monsanto; Benita J. Rohm

(57) ABSTRACT

A work holder support arm for supporting a work article at a desired orientation with respect to a support structure is provided with a first clamp (12) having clamped and unclamped states for coupling with the support structure. The first clamp (12) has an opening therethrough for accommodating the support structure, and there may be provided a through-hole arranged transverse to the opening. A shaft portion (27) is coupled to the first clamp (12), the shaft portion (27) having a longitudinal bore therethrough arranged to be axial in registration with the through-hole of the first clamp. Additionally, a second clamp (11) couples with the work article and has clamped and unclamped states. A tube portion (14) is coupled to the second clamp (11) for accommodating telescopically therewithin the first shaft portion (27). An expansion portion (30) is arranged coaxially with the shaft portion (27) within the tube portion (14) and is provided with a threaded section. The expansion portion (30) and the shaft portion (27) have corresponding transverse ramps (34, 35) arranged to communicate with each other. A further embodiment prevents inadvertent separation of the tube and shaft portions.

18 Claims, 2 Drawing Sheets

UNIVERSAL WORK HOLDER ARRANGEMENT

This application is a continuation-in-part patent application of U.S. patent application Ser. No. 09/102,543, filed Jun. 22, 1999 now U.S. Pat. No. 6,059,278 by the same inventors as herein.

BACKGROUND OF THE INVENTION

1. Field of the Invention

This invention relates generally to arrangements for holding work pieces at predetermined or convenient orientations, and more particularly, to an arrangement that allows simultaneous locking in place and clamping of a work holder arrangement at a precise location and orientation, and with multiple degrees of freedom with infinite resolution.

2. Description of the Related Art

Support arms for work holder arrangements are used in the prior art in various ways, such as for preparing sheet metal parts for assembly or further production. Often, such arrangements are employed with a holding arrangement that includes a suction cup, and are used to carry articles from one production process to another, or to hold the articles during processing.

It is desired to provide a mounting bracket, or arm, that affords quick orientation and clamping of the bracket into a desired position, while also permitting infinite resolution over multiple degrees of freedom. Some prior art work holder arrangements achieve rapid clamping and setting with a single fastener. These known brackets, however, achieve the clamping convenience at the expense of degrees for freedom. For example, a known bracket that clamps and sets with a single fastener provides neither axial extension of the bracket nor rotational positioning about the axis. This known bracket, therefore, is not universal.

Similarly, a further known bracket that has endeavored to achieve the capacity for rotational positioning about the axis requires that fixation be effected only at predetermined increments of rotation. This known arrangement does not provide infinite rotational placement resolution, and provides no axial extension whatsoever.

It is, therefore, an object of this invention to provide a mounting bracket arrangement for a work piece in process that provides rotational and axial placement about the bracket axis.

It is another object of this invention to provide a mounting bracket arrangement for a work piece in process that provides infinite placement resolution in rotational and axial placement of the work piece with respect to the bracket axis.

It is also an object of this invention to provide a mounting bracket arrangement for a work piece in process that provides up to four degrees of freedom of placement of the workpiece with respect to a mounting structure.

SUMMARY OF THE INVENTION

The foregoing and other objects are achieved by this invention which provides, in accordance with a first apparatus aspect thereof, a work holder arrangement for supporting a work article at a desired orientation with respect to a support structure. The work holder arrangement is provided with a first clamp member for coupling with the support structure, the first clamp member having clamped and unclamped states. There is additionally a second clamp member for coupling with the work article, the second clamp member having clamped and unclamped states. A tube portion is coupled to selected one of the first and second clamp members, and a shaft portion is coupled to the other of the first and second clamp members. The shaft portion is accommodates, coaxially within the tube portion. Additionally, there is provided an expansion portion arranged coaxially with the shaft portion within the tube portion. The invention further is provided with an elongated member for engaging with the expansion portion and for applying an axial force thereto. Thus, upon the application of the axial force, the expansion portion is urged transaxially against an interior surface of the tube portion, and the selected one of the first and second clamp members simultaneously is urged into the clamped state.

In one embodiment of the invention, the expansion portion is provided with a transverse ramp portion, and the shaft portion is terminated at an end portion thereof distal from the selected one of the first and second clamp members with a corresponding transverse ramp portion. In this manner, the transverse ramp portion of the expansion portion and the corresponding transverse ramp portion of the end portion of the shaft portion are arranged to communicate with each other. The expansion portion is engaged with the elongated member, and the axial force applied thereto is responsive to a displacement of the elongated member with respect to the expansion portion. Further in accordance with this embodiment of the invention, the communication between the transverse ramp portion of the expansion portion and the corresponding transverse ramp portion of the end portion of the shaft portion precludes rotation of the expansion portion as the elongated member is rotated.

Preferably, the shaft portion has a longitudinal bore therethrough for accommodating the elongated member. The longitudinal bore is axially arranged and dimensioned to accommodate a transaxial displacement of the elongated member, which occurs when the expansion portion is urged along the transverse ramp portion. In other embodiments, however, the elongated member is itself transaxially deformed, or flexed, to accommodate the transaxial displacement of the expansion portion as it is urged along the transverse ramp portion.

In a further embodiment of the invention, the shaft portion and the tube portion each have a circular cross-sectional configuration, whereby the expansion portion can be urged transaxially against an interior surface of the tube portion to fix the shaft portion at any axial location within the tube portion within a predetermined limit and at any rotational orientation between the shaft and tube portions. That is, the axial location of the shaft portion within the tube portion is adjustable with infinite resolution, as is the rotational orientation between these two portions.

In a practical application of the invention, the support structure is in the form of a support bar having a predetermined cross-sectional configuration. The first clamp member is configured to be rotatable about support bar, and slidable axially therealong, when the first clamp member is in the unclamped state. It is fixed axially and rotationally thereto when the first clamp member is in the clamped state.

In a still further embodiment of the invention, there is additionally provided a work article engagement arrangement having a predetermined configuration, and the second clamp member is correspondingly configured. The work article engagement arrangement is angularly displaceable when the second clamp member is in the unclamped state, and fixed angularly with respect thereto when the second clamp member is in the clamped state. In a practical embodiment, the work article engagement arrangement has a substantially spherical configuration and the second clamp member is correspondingly configured to have a concave configuration. The work article engagement arrangement in this embodiment is displaceable angularly with infinite resolution over a conical region. Alternatively, the work article engagement arrangement has a substantially cylindrical or somewhat concave (or apple-core-like) configuration and the second clamp member is correspondingly configured to have a substantially cylindrical internal configuration. In this substantially cylindrical embodiment of the invention, however, the work article engagement arrangement is not displaceable angularly.

In a highly advantageous embodiment of the invention, the first clamp member and the shaft portion are integrally formed with each other. The expansion portion has a cross-sectional configuration that corresponds to the cross-sectional configuration of the shaft portion. Similarly, in this advantageous embodiment, the second clamp member and the tube portion are integrally formed with each other.

The axial force applied by the elongated member urges the first clamp portion and the expansion portion toward each other.

In accordance with a further apparatus aspect of the invention, there is provided a work holder support arm for supporting a work article at a desired orientation with respect to a support structure. The work holder arrangement is provided with a first clamp member having clamped and unclamped states for coupling with the support structure. The first clamp member has an opening therethrough for accommodating the support structure, and through-hole arranged transverse to the opening. A shaft portion is coupled to the first clamp member, the shaft portion having a longitudinal bore therethrough arranged to be axially in registration with the through-hole of the first clamp member. Additionally, there is provided a second clamp member for coupling with the work article, the second clamp member having clamped and unclamped states. A tube portion is coupled to the second clamp member for accommodating telescopically therewithin the first shaft portion. An expansion portion is arranged coaxially with the shaft portion within the tube portion, and is provided with a threaded section. An elongated member with a threaded portion for engaging with the threaded section of the expansion portion is provided for applying an axial force thereto. Upon the application of the axial force, the expansion portion is urged transaxially against an interior surface of the tube portion, and simultaneously the selected one of the first and second clamp members is urged into the clamped state.

In one embodiment of this further aspect of the invention, the first clamp member and the shaft portion are integrally formed. Similarly, the second-clamp member and the tube portion are integrally formed.

In a preferred embodiment, the expansion portion and the shaft portion have. corresponding transverse ramps arranged to communicate with each other, where by upon the application of the axial force, the expansion portion is urged along the transverse ramp of the shaft portion and substantially radially against an interior surface of the tube portion As previously noted, a work article engagement arrangement has a predetermined configuration, and the second clamp member is correspondingly configured. Thus, the work article engagement arrangement is angularly displaceable when the second clamp member is in the unclamped state, and fixed angularly with respect thereto when the second clamp member is in the clamped state. The work article engagement arrangement is in this embodiment, displaceable with infinite resolution over a conical region.

BRIEF DESCRIPTION OF THE DRAWING

Comprehension of the invention is facilitated by reading the following detailed description, in conjunction with the annexed drawing, in which.

DETAILED DESCRIPTION

Figure 1:
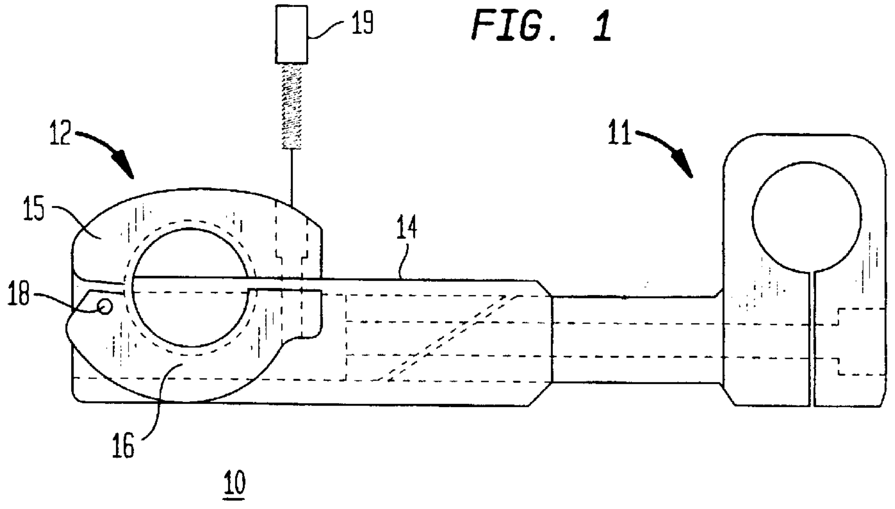
FIG. 1 is a plan view of a specific illustrative embodiment of the invention in the form of a work holder bracket.

FIG. 1 is a plan view of a specific illustrative embodiment of the invention in the form of a work holder bracket 10. Work holder bracket 10 is formed of two major components, a shaft clamp that is generally designated as 11 and shown partially in phantom, and a tube clamp that is generally-designated as 12.

Tube clamp 12, in this specific illustrative embodiment of the invention, has a tube portion 14 that has a first clamp subportion 15 installed thereon. In this embodiment, first clamp subportion 15 is integrally formed with tube portion 14. A second clamp subportion 16 is pivotally coupled at pivot 18 to first clamp subportion 15, and is forcefully urged thereto to effect a clamping by operation of a fastener 19. Other arrangements for effecting the clamping, such as toggle latches (not shown), can be used in the implementation of the invention.

Figure 2:
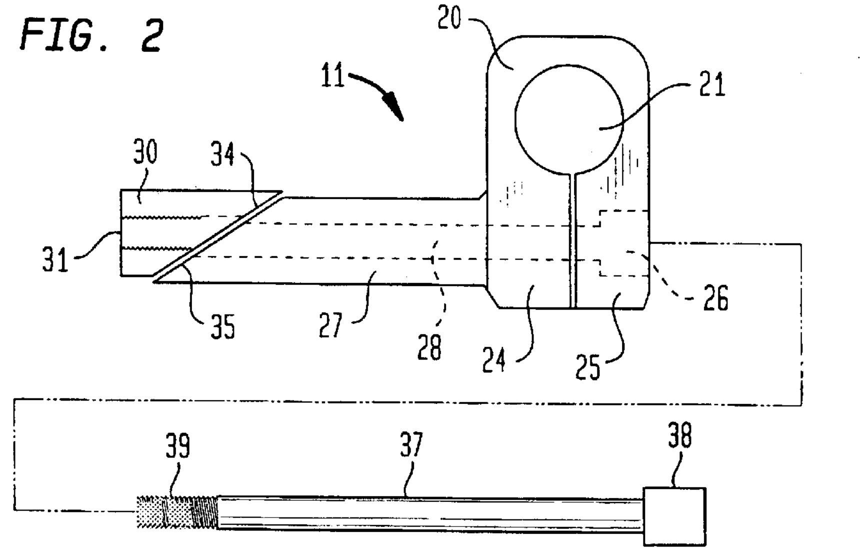
FIG. 2 is a plan view of the mounting portion of the work holder bracket of FIG. 1 showing ramp portions that enable fixation thereof with respect to the other portion by means of transaxial displacement of an expansion portion.

FIG. 2 is a plan view of the mounting portion of the work holder bracket 10 of FIG. 1 showing shaft clamp 11 in greater detail. As shown, shaft clamp 11 has a clamp portion 20 having an aperture 21 therethrough. This aperture, in the practice of the invention, will accommodate a mounting bar (not shown) associated with a mounting structure (not shown). Clamp portion 20 appears to wrap around aperture 21 so as to have two leg portions 24 and 25. A further aperture 26 is arranged at the end of clamp portion 20, and directed in a direction orthogonal to aperture 21.

Leg portion 24 is coupled to a shaft portion 27. In a preferred embodiment, these elements are fixed to one another by integral formation, weldment (not shown), threaded coupling (not shown), or otherwise. Shaft portion 27 has an axial bore 28 therethrough that is in axial registration with aperture 26 that begins on leg portion 25.

There is additionally shown in this figure an expansion portion 30 having an internally threaded portion 31. Expansion portion 30 has a transaxial ramp portion 34 that is arranged to communicate with a corresponding ramp portion 35 at the end of tube portion 27 distal from clamp portion 20. An elongated member 37 having a head 38 and a distal threaded portion 39 is configured to be accommodated into aperture 26 and to extend along axial bore 28 of tube portion 27. Threaded portion 39 of the elongated member is configured to engage threadedly with internally threaded portion 31 of expansion portion 30. Thus, as elongated member 37 is rotated in a tightening direction, expansion portion 30 is urged transaxially along the interface of ramp portions 34 and 35, placing a radial force against the inner surface of tube portion 14. Thus, the respective ramp portions enable fixation of the shaft portion within the tube portion at any axial location, within the predetermined limits of their respective lengths, and at any rotational orientation with respect thereto. Infinite placement resolution is thereby achieved.

Rotation of expansion portion 30 with the rotation of elongated member 37 is precluded by the interface of ramp portion 34 and 35. Also, it is seen that as expansion portion 30 is urged transaxially along the ramp portions, elongated member 37 is similarly transaxially displaced. Thus, axial bore 28 of shaft portion 27 must be configured with a diameter sufficient to accommodate the transaxial displacement of the elongated member.

Figure 3:
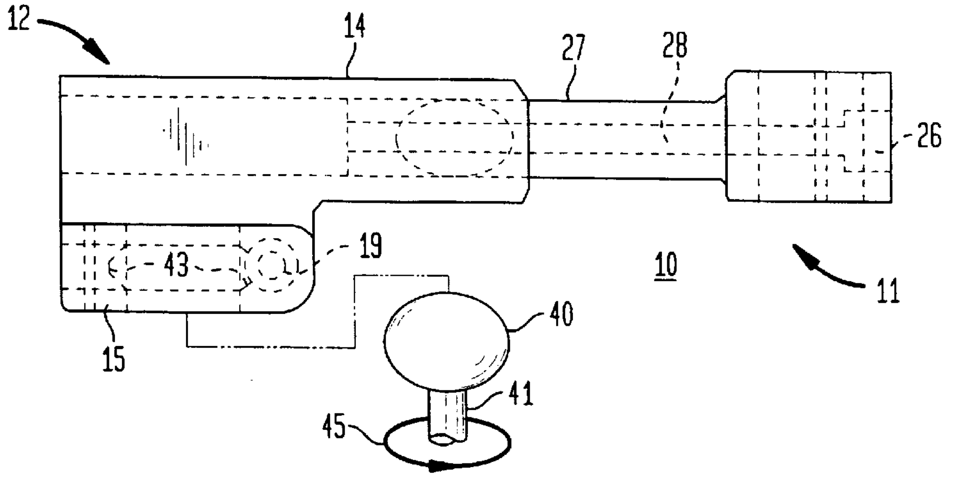
FIG. 3 is a side view of the embodiment of FIG. 1, further showing the arrangement by which an additional rotational and angular degree of placement freedom of the work piece is achieved.

FIG. 3 is a side view of the embodiment of FIG. 1, further showing the arrangement by which an additional rotational and angular degree of placement freedom of the work piece is achieved. Elements of structure that previously have been discussed are similarly designated. In some embodiments of the invention, a substantially spherical work holder element 40 is provided, having a work holder shaft 41 coupled thereto. First and second subclamp portions 15 and 16 (not specifically designated in this figure) have substantially spherically contoured internal surfaces 43 that will engage with the substantially spherical outer surface of work holder element 40. When work holder element 40 is engaged with contoured internal surfaces 43, work holder shaft 41 is rotationally movable, as well as angularly movable, as indicated by arrow 45. Tightening of fastener 19 will fix the work holder element at any desired orientation within the first and second subclamp portions 15 and 16, respectively.

The present invention therefore provides a mounting arrangement that affords the following degrees of freedom, each with infinite placement resolution:

rotation of clamp portion 20 about the mounting bar (not shown);

axial displacement between shaft clamp 11 and tube clamp 12; and axial rotation between shaft clamp 11 and tube clamp 12.

In some embodiments of the invention, there are provided the additional degrees of freedom with infinite resolution of:

rotation of work holder shaft 41 with respect to shaft clamp 11 and tube clamp 12; and angular displacement of work holder shaft 41 with respect to shaft clamp 11 and tube clamp 12.

Figure 4:
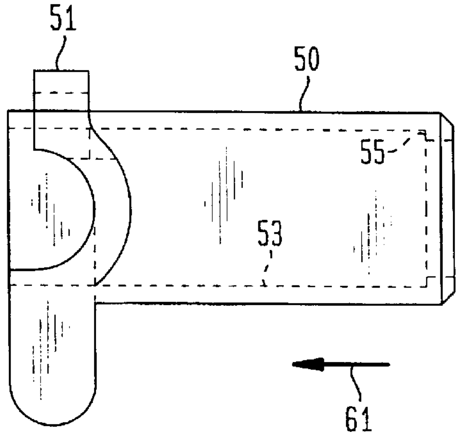
FIG. 4 is a plan view of a tubular receiving portion of a further embodiment of the invention that prevents inadvertent separation of the tube and shaft portions.

FIG. 4 is a plan view of a tube portion 50 of a further embodiment of the invention that prevents inadvertent separation of the tube and shaft portions. As shown in this figure, the tube portion 50 is coupled to a clamp portion 51 that is similar to that described hereinabove. In this embodiment, however, tube portion 50 has an inner surface 53 that is shown to be terminated with a radially inward extending annular engagement portion 55.

Figure 5:
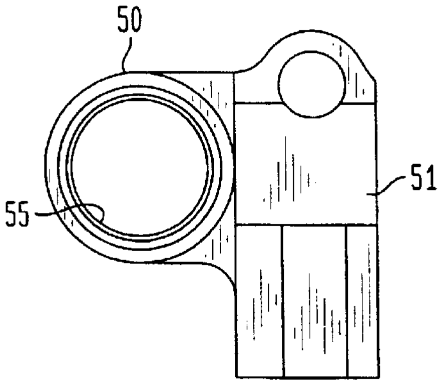
FIG. 5 is an end view of the embodiment of FIG. 4.

FIG. 5 is an end view of the embodiment of FIG. 4. In this figure it can be seen that tube portion 50 is cross-sectionally circular in this embodiment, and that the radially inner surface of annular engagement portion 55 is of smaller diameter than the diameter of inner surface 53.

Figure 6:
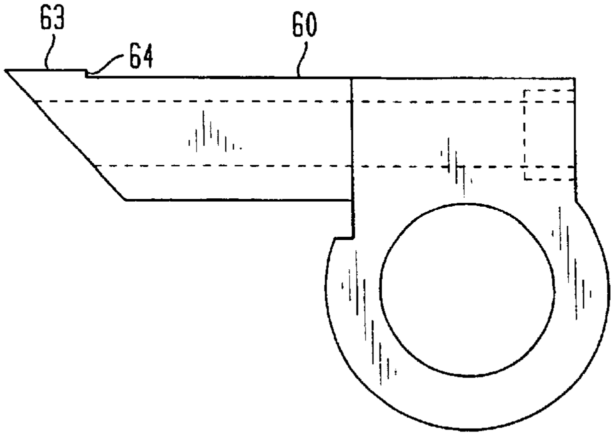
FIG. 6 is a plan view of a shaft portion of the further embodiment of the invention that prevents inadvertent separation of the tube and shaft portions, for engagement within the tubular receiving portion of FIG. 4.

FIG. 6 is a plan view of a shaft portion 60 of the further embodiment of the invention that prevents inadvertent separation of the tube and shaft portions, for engagement within the tubular portion 50 of FIG. 4. Shaft portion 60 is coupled to a clamp portion 61 that is similar to that described hereinabove. In this embodiment, however, shaft portion 60 has integrally formed therewith a radial protuberance 63 having an engagement surface 64. When shaft portion 60 is engaged within tube portion 50, in the direction of arrow 61, it is maintained in substantially coaxial relation therewith by operation of an expansion portion (not shown in this figure), such as expansion portion 30, described hereinabove in connection with FIG. 2. During such engagement, total withdrawal of the shaft portion from the tube portion is precluded by the communication between the inner surface of annular engagement portion 55 and engagement surface 64. Therefore, in this specific illustrative embodiment of the invention, the engagement between shaft portion 60 and tube portion 50 is achieved before the expansion portion is coupled to the shaft portion.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof

What is claimed is:

1. A work holder support arm for supporting a work article at a desired orientation with respect to a support structure, the work holder arrangement comprising:

a first clamp member having clamped and unclamped states for coupling with the support structure, said first clamp member having an opening therethrough for accommodating the support structure, and further having a through-hole arranged transverse to the opening;

a shaft portion coupled to said first clamp member, said shaft portion having a longitudinal bore therethrough, the longitudinal bore being arranged to be axially in registration with the through-hole of said first clamp member, said shaft portion having a radially outward protuberance;

a second clamp member for coupling with the work article, said second clamp member having clamped and unclamped states;

a tube portion coupled to said second clamp member for accommodating telescopically therewithin said shaft portion, said tube portion having a radially inward annular protuberance;

an expansion portion arranged to communicate coaxially with said shaft portion within said tube portion for ensuring that the radially outward protuberance of said shaft portion communicates with the radially inward annular protuberance of said tube portion to prevent axial separation of said shaft and tube portions, said expansion portion having a threaded section; and elongated means having a threaded portion for engaging with the threaded section of said expansion portion and applying an axial force thereto, whereby upon the application of the axial force, said expansion portion is urged transaxially against an interior surface of said tube portion, and the selected one of said first and second clamp members simultaneously is urged into the clamped state.

2. The work holder support art of claim 1, wherein said first clamp member and said shaft portion are integrally formed.

3. The work holder support art of claim 1, wherein said second clamp member and said tube portion are integrally formed.

4. The work holder support art of claim 1, wherein said expansion portion and said shaft portion have corresponding transverse ramps arranged to communicate with each other, whereby upon the application of the axial force, said expansion portion is urged along the transverse ramp of said shaft portion and substantially radially against an interior surface of said tube portion.

5. The work holder support art of claim 1, wherein there is further provided a work article engagement arrangement having a predetermined configuration, and said second clamp member is correspondingly configured, whereby said work article engagement arrangement is angularly displaceable when said second clamp member is in the unclamped state, and fixed angularly with respect thereto when said second clamp member is in the clamped state.

6. A work holder support arm for supporting a work article at a desired orientation with respect to a support structure, the work holder arrangement comprising:

a first clamp member having open and clamped states for coupling with the support structure, said first clamp member being installable on, and movable with respect to, the support structure when said first clamp member is in the open state;

a second clamp member for coupling with the work article, said second clamp member having clamped and unclamped states;

a shaft portion coupled to a selectable one of said first and second clamp members, said shaft portion having a longitudinal bore therethrough, said shaft portion having a radially outward protuberance;

a tube portion coupled to the other of said first and second clamp members for accommodating telescopically therewithin said shaft portion, said tube portion having a radially inward annular protuberance;

an expansion portion arranged to communicate coaxially with said shaft portion within said tube portion for ensuring that the radially outward protuberance of said shaft portion communicates with the radially inward annular protuberance of said tube portion to prevent axial separation of said shaft and tube portions, said expansion portion having a threaded section; and elongated means having a threaded portion for engaging with the threaded section of said expansion portion and applying an axial force thereto, whereby upon the application of the axial force, said expansion portion is urged transaxially against an interior surface of said tube portion, and the selected one of said first and second clamp members simultaneously is urged into the clamped state.

7. The work holder support arm of claim 6, wherein said first clamp member is coupled to said shaft portion and said second clamp member is coupled to said tube portion.

8. The work holder support arm of claim 6, wherein said first clamp member is provided with:

a hinged portion that is pivotally rotatable about a hinge when said first clamp member is in the open state; and a locking element for urging said hinged portion forcefully into a closed condition, corresponding to the clamped state of said first clamp member.

9. The work holder support arm of claim 8, wherein said locking element comprises a threaded fastener.

10. A work holder arrangement for supporting a work article at a desired orientation with respect to a support structure, the work holder arrangement comprising:

a first clamp member for coupling with the support structure, said first clamp member having clamped and unclamped states;

a second clamp member for coupling with the work article, said second clamp member having clamped and unclamped states;

a tube portion coupled to a selected one of said first and second clamp members, said tube portion having a first stop portion;

a shaft portion coupled to the other of said first and second clamp members, said shaft portion being accommodated coaxially within said tube portion, and terminated at an end portion thereof distal from the selected one of said first and second clamp members with a corresponding transverse ramp portion, said shaft portion having a second stop portion for communicating with the first stop portion;

an expansion portion arranged coaxially with said shaft portion within said tube portion for ensuring that the second stop portion of said shaft portion communicates with the first stop portion of said tube portion to prevent axial separation of said shaft and tube portions, said expansion portion having a further transverse ramp portion, the further transverse ramp portion of said expansion portion and the corresponding transverse ramp portion of the end portion of said shaft portion being arranged to communicate with each other; and elongated means for engaging with said expansion portion and applying an axial force thereto, whereby upon the application of the axial force, said expansion portion is urged transaxially against an interior surface of said tube portion, and the selected one of said first and second clamp members simultaneously is urged into the clamped state.

11. The work holder arrangement of claim 10, wherein the first stop portion is a radial protuberance.

12. The work holder arrangement of claim 10, wherein said shaft portion is provided with a second stop portion for preventing axial separation of said tube and shaft portions.

13. The work holder arrangement of claim 10, wherein said expansion portion is engaged with said elongated means, and the axial force applied thereto is responsive to a displacement of said elongated means with respect to said expansion portion.

14. The work holder arrangement of claim 10, wherein said shaft portion has a longitudinal bore therethrough for accommodating said elongated means.

15. The work holder arrangement of claim 14, wherein said longitudinal bore is axially arranged and dimensioned to accommodate a transaxial displacement of said elongated means.

16. The work holder arrangement of claim 10, wherein there is further provided a work article engagement arrangement having a predetermined configuration, and said second clamp member is correspondingly configured, whereby said work article engagement arrangement is angularly displaceable when said second clamp member is in the unclamped state, and fixed angularly with respect thereto when said second clamp member is in the clamped state.

17. The work holder arrangement of claim 16, wherein said work article engagement arrangement has a substantially spherical configuration and said second clamp member is correspondingly configured to have a concave configuration.

18. The work holder arrangement of claim 16, wherein said work article engagement arrangement has a substantially concave configuration and said second clamp member is correspondingly configured to have a substantially cylindrical internal configuration.

* * * * *